Figure 1:
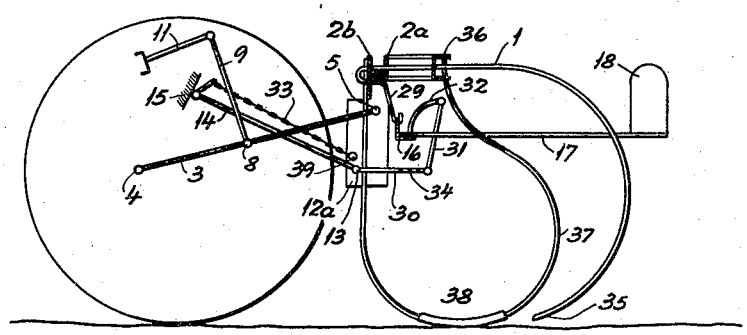

June 14, 1955  E. JOHANNESEN  2,710,515
TRACTOR MOUNTED FIELD RAKE
Filed Nov. 4, 1952  2 Sheets-Sheet 1

INVENTOR
Erwin Johannesen

June 14, 1955  E. JOHANNESEN  2,710,515
TRACTOR MOUNTED FIELD RAKE

Filed Nov. 4, 1952  2 Sheets-Sheet 2

INVENTOR
Erwin Johannesen
By Richardson, David and Nordon
his ATTYS.

2,710,515

TRACTOR MOUNTED FIELD RAKE

Erwin Johannesen, Roskilde, Denmark

Application November 4, 1952, Serial No. 318,697

Claims priority, application Denmark December 21, 1951

9 Claims. (Cl. 56—27)

This invention relates to a tractor-borne field rake, the teeth of which are attached to a rake beam, which can be raised and lowered and simultaneously rotated about an axis parallel to its longitudinal axis, and which is connected to and carried by the tractor by means of a system of rods comprising both one or more elevating rods and guiding rods, which are individually linked to individual points of connection at different heights on both the tractor and the rake beam or a projection thereon, the elevating rod or rods being connected to an elevator arm on the tractor.

According to the present invention the field rake, apart from the system of rods, has at least one chain, preferably adjustable in length, which connects the tractor to the rake beam or to a projection thereon, and which is attached to the tractor at a point higher than the point of attachment of the chain to the rake beam or its projection.

When the teeth are in their lowered position the rake beam hangs in the one or more chains, and by adjusting the length of the chains, the points of the teeth may be held at any desired height above the ground. A further advantage is that it is impossible for the teeth to fall down on the ground and be damaged, in that the downward movement of the rake beam is limited by the length of the chains.

The invention further provides that the elevating rods and guiding rods always cross each other, in that the elevating rod or rods are attached to the tractor at the lower points of connection of the rod system, and to the rake beam or a projection thereon at the higher points of connection, whilst the opposite is the case with the guiding rods.

This arrangement of rods has the effect not only of ensuring a substantial rotation of the rake beam with a minimum of lifting, thereby reducing the power required to operate the rake beam, but it also imparts to the points of the teeth a rearwards and upwards movement, so that the teeth readily are freed of the raked up matter, which does not have to be lifted. A further advantage of this system is that the whole construction becomes simpler and lighter in weight.

A further feature of the invention is that the chain is attached to the rake beam or a projection thereon below the rake beam's point of rotation and between the points of attachment of the system of rods to the rake beam, and preferably only a small distance above the lower point of attachment, so that the rake becomes self-locking.

By this means it is possible to overcome the tendency that some field rakes have, namely for the teeth to lift from the ground should the rake be over-loaded with raked up material. The weight of the rake, which is taken by the chain, tends to keep the teeth in position, and the chain taut.

According to the invention there is also provided means for adjusting the length of at least one of the rods in the rod system, so that it is a relatively simple matter to regulate the position of the rake beam and to change the rake from one tractor to another.

With a field rake according to the invention and having a stripping beam to which are attached rods serving to strip the raked up material from the teeth of the rake during its upward movement, it is a further feature of the invention that the stripping beam is rotatably linked with one of the rods of the rod system in such a manner that the stripping rods are turned downwards as the rake teeth are elevated. This not only limits the height to which it is necessary to raise the teeth, but also ensures a rapid stripping of the raked up material, which can be dumped in a compact heap, even whilst the tractor is travelling.

This rod which is connected to the stripping beam may, in accordance with the invention, have an extension piece, which is connected to the stripping beam by means of a link, and the operative length of this rod or its extension may, according to the invention, be made adjustable. By this means a simple mechanism to operate the stripping beam is obtained, and the position of the stripping rods may be adjusted as desired.

According to a further feature of the invention the guiding rod or rods of the rod system has legs which splay out or which cross each other, and by this means greater rigidity of the rod and the rake beam is obtained.

The invention further provides for the projection or projections on the rake beam to be made from a Z-iron with one flange projecting forwards and the other flange projecting rearwards, the elevating rods being attached to the rearwards projecting flange and the guiding rod to the forwards projecting flange of the Z-iron. By this means is obtained a very robust and simple structure to which the elevating rod and guiding rod are fixed, and also a simple means of attaching the elevating rod to the rake beam at a point behind the point of attachment of the guiding rod.

According to a further feature of the invention the field rake is provided with two or more downwardly curved spring rods, bent in the form of an open loop, the lower part of which is arranged to drag along the ground when the rake is in its operating position, the upper ends of the loop being attached, one end to the rake beam and the other end to a beam attached to the rake beam, parallel to and a short distance rearwards of it. These loops constitute a form of well sprung drag shoe and have several important functions. They are preferably fixed at the two ends of the rake. Should the rake fall from its raised position towards the ground, the springs will reach the ground first and will help to protect the teeth from damage. They also act as stabilisers to the rake when it is in operation and steady it laterally, especially on rough uneven ground. Furthermore they act as a partial closure at the ends of the rake and prevent the raked up material from escaping sideways at the ends of the rake.

They can according to the invention be so shaped that when in operating position the rearmost portion has the same shape as a standard end tooth, which is positioned somewhat in advance of the row of main teeth.

The attachment of the spring rods to the rake beam may, according to the invention be made adjustable. By this means the height of the teeth above the ground may be adjusted at will.

A further feature of the invention is that drag shoes may be attached to that portion of the spring rods that slides along the ground, so that the spring rods themselves are protected from abrasion.

Figure 2:
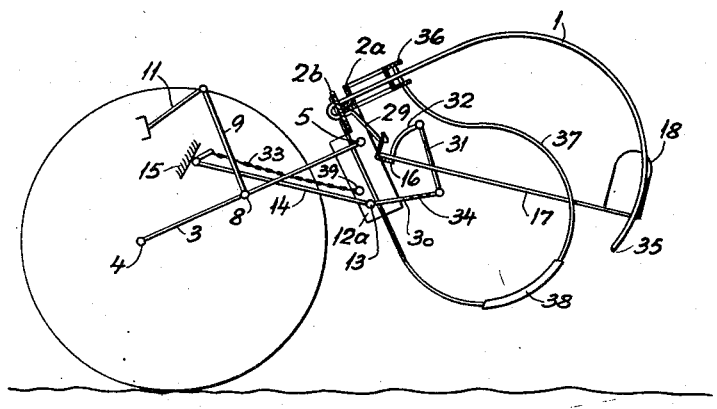
Figure 3:
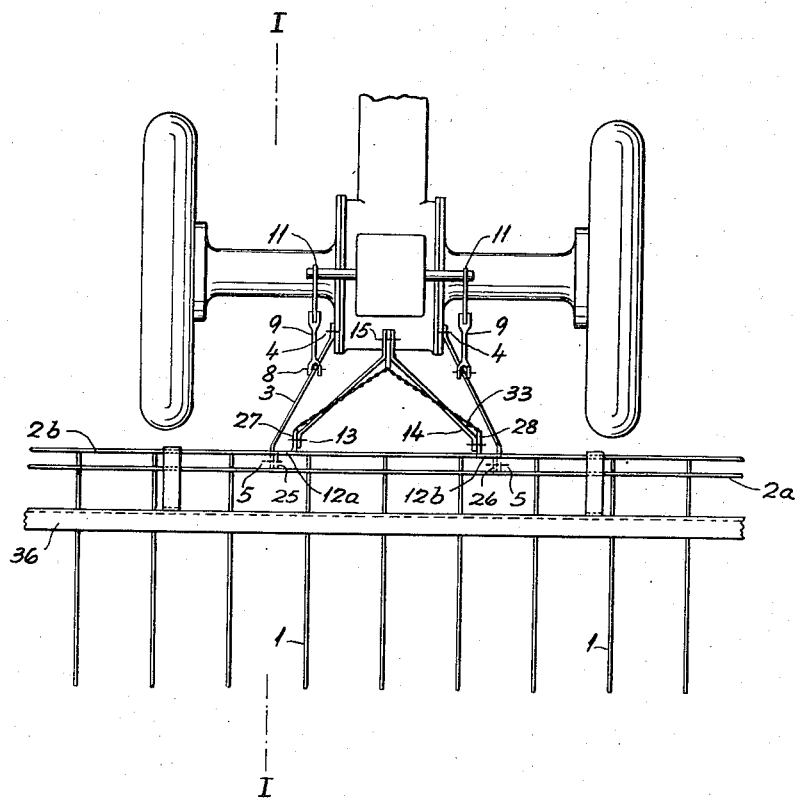

Further objects and advantages of the present invention will be apparent from the following description, reference being had to the accompanying drawing wherein an embodiment of the invention is clearly shown, Figure 1 shows a field rake according to the present invention seen from the side, with the teeth in lowered position, Figure 2 shows the same with the teeth in raised position, and Figure 3 shows a plan view of part of such a field rake.

As shown in Figs. 1 and 2 the teeth 1 of the rake which are formed in known manner are affixed to a rake beam, which is shown built up of an angle iron 2a and a T-iron 2b, to which are fastened two projections 12a and 12b made of Z-iron.

These carry pins 5 and 13 for bearings on the rearward end of elevating rods 3 and guiding rod 14. The forward ends of these rods have bearings which fit on pins 4 and 15 on the tractor. The rods 3 and 14 cross each other as shown. The elevator rod 3 is shown appreciably longer than the guiding rod 14, and its forward end is connected to the tractor at a lower point than the corresponding end of rod 14, while the opposite is the case as regards their rearward ends. The elevator rods 3 are at a point 8, connected by a link 9 to the tractor's elevating arm 11, by means of which the rake beam may be elevated or lowered. The guiding rod 14 guides the rake beam during these operations and causes it to turn.

The guiding rod 14 may, as shown in Fig. 3, have two splayed out legs, the rear ends of which are attached to the two forward projecting flanges 27 and 28, of the two Z-iron projections 12a and 12b, while the rear ends of rods 3 are connected at bearings 5 with the rearwards projecting flanges 25 and 26. Two chains 33 are shown attached at their forward end to a point adjacent to and slightly above bearing 15, while their rear ends are attached to flanges 27 and 28 at points 39 slightly above bearings 13. When the teeth are in lowered position, as in Fig. 1, the rake beam and the Z-iron projections hang in the chains 33, which are taut. As arm 3 is elevated and pivots about bearing 4, the rod 14 will also rise and pivot about bearing 15.

The projections and the rake beam will pivot about bearing 13, which is slowly being raised, and the points 35 of the teeth 1, will undertake a backward and upward movement about bearing 13.

A stripping beam 16, which carries stripping rods 17 with brackets 18 at their outer ends, carries a fixed arm 32 which is rotatably connected to a link 31, the other end of which is rotatably connected to an extension 30 of rod 14. The stripping beam 16 is supported on brackets 29 from the rake beam 2a, 2b, and can swing in these brackets. The extension 30 is fitted with holes 34, so that its operative length may be altered by connecting the lower end of arm 31 to any desired hole. As the bracket 29, when the teeth are being raised, swings upwards and forwards, and the rear end of rod 30 swings upwards and rearwards about bearing 15, the effect will be that the stripping rods are turned downwards about the brackets 29, and so assist in stripping the raked up material from the teeth.

A channel iron 36 which runs the whole length of the rake is firmly attached by means of brackets to the rake beam 2a, 2b and a short distance behind it. The web of this channel iron is parallel with the flanges of the rake beam, and has a series of parallel slots through which pass the rake teeth 1, and in which they are free to move up and down.

A steel spring rod 37 placed at each end of the rake, and bent in the form of an open loop has its one end fixed to the channel iron 36 and its other end adjustably attached to the rake beam. To the lower part of the loop are attached cast steel drag shoes 38, which are curved so that they will easily ride over rough ground. When the rake is in its operating position, as shown in Fig. 1, it will be seen that the weight of the rake deforms the loops, and the spring rods tend to support the rake. When the rake is lifted and no pressure is put on the spring rods, these take up their uncompressed position as shown in Fig. 2.

What is claimed is:

1. A field rake adapted to be borne by a tractor which is provided with hydraulic lifting mechanism, said rake comprising, in combination: a plurality of rearwardly extending rake teeth; a rigid transverse rake beam on which said rake teeth are carried; two rigid, downwardly-extending projections rigidly secured to said rake beam; two elevating arms operatively connected to said hydraulic lifting mechanism capable of being swung vertically upward thereby, said elevating arms having their front ends pivotally attached to the tractor, and their rear ends pivotally attached to said projections at points thereon which are in a plane above that of the front ends of said arms; and a guiding rod having two rearwardly-extending diverging legs, the front end of said guiding rod being pivotally attached to the tractor at a point in a plane above that of the front ends of said elevating arms, and the rear ends of said two diverging legs being pivotally attached to said projections at points thereon which are in a plane below that of the points of attachment of the rear ends of said elevating arms, whereby upward vertical swinging of said elevating arms by the hydraulic lifting mechanism of the tractor causes an upward and forward arcuate movement of the upper ends of said projections, and an upward vertical swinging movement of said guiding rod, which upward swinging movement causes an upward and rearward arcuate movement of the lower ends of said projections, thereby bringing about a lifting and a rotation of said rake beam and said rake teeth carried thereby.

2. A field rake as defined in claim 1, wherein the combination also includes two adjustable chains connecting said rake to the tractor, the front ends of said chains being attached to said tractor at points thereon adjacent to the point of attachment of said guiding rod, and the rear ends of said chains being attached to said downwardly-extending projections at points thereon which are in a plane slightly above that of the points at which said rear ends of said diverging legs are pivotally attached to said projections, said points of attachment of said chains being, however, below the axis of rotation of said rake beam, whereby said rake beam is self-locking when in its lowered position, downward movement of said rake beam is limited, and said rake is prevented from swinging from side to side when in use.

3. A field rake according to claim 1, including extensions of the diverging legs of said guiding rod rearwardly of said projections on said rake beam, and a stripping beam carrying stripping rods and serving to strip the raked up material from the teeth of the rake, means for rotatably carrying said stripping beam by the rake beam, a link connecting the stripping beam to the extension of the guiding rod so that the stripping rods are rotated downwards as the rake teeth are elevated, and vice versa.

4. A field rake according to claim 3, including means for adjusting the operative length of said link.

5. A field rake according to claim 1, in which the projections on the rake beam are made from Z-iron with one flange projecting forwards and the other flange projecting rearwards the elevating rods being attached to the rearwards projecting flanges and the diverging legs of said guiding rod to the forwards projecting flanges.

6. A field rake according to claim 1, also having at least two downwardly projecting curved spring rods bent in the form of an open loop, the lower part of said loop being arranged to drag along the ground when the rake is in its operating position, the upper ends of said loop being attached, one end to the rake beam and the other end to a beam attached to the rake beam, parallel to and a short distance rearwards thereof.

7. A field rake according to claim 6, in which the rearmost portion of said loop when the rake is in operating position has the same shape as a standard end tooth, said portion being positioned somewhat in advance of the row of main teeth.

8. The field rake of claim 7, including means for adjusting the attachment means of the spring rods to the rake beam.

9. The field rake of claim 8, including also drag shoes attached to that portion of the spring rods that drags along the ground.

References Cited in the file of this patent
UNITED STATES PATENTS

| | | |
|---|---|---|
| 2,475,908 | McCleskey | July 12, 1949 |
| 2,634,572 | Collins | Apr. 14, 1953 |